US012359631B2

(12) United States Patent
Kaneko et al.

(10) Patent No.: US 12,359,631 B2
(45) Date of Patent: Jul. 15, 2025

(54) FUEL SUPPLY CONTROL DEVICE AND VEHICLE

(71) Applicant: Isuzu Motors Limited, Kanagawa (JP)

(72) Inventors: Shinichiro Kaneko, Fujisawa (JP); Takayuki Kiuchi, Fujisawa (JP); Koji Goto, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/708,626

(22) PCT Filed: Sep. 14, 2022

(86) PCT No.: PCT/JP2022/034385
§ 371 (c)(1),
(2) Date: May 9, 2024

(87) PCT Pub. No.: WO2023/084908
PCT Pub. Date: May 19, 2023

(65) Prior Publication Data
US 2025/0003372 A1    Jan. 2, 2025

(30) Foreign Application Priority Data
Nov. 10, 2021  (JP) .................................. 2021-183342

(51) Int. Cl.
*F02D 19/06* (2006.01)
(52) U.S. Cl.
CPC .. *F02D 19/0647* (2013.01); *F02D 2200/0606* (2013.01)

(58) Field of Classification Search
CPC ..................... F02D 2200/0606; F02D 19/0647
See application file for complete search history.

(56) References Cited

U.S. PATENT DOCUMENTS

2016/0290248 A1   10/2016  Sugishita et al.

FOREIGN PATENT DOCUMENTS

| JP | 2005-207341 | 8/2005 | |
| JP | 2006-104941 | 4/2006 | |
| JP | 2014-167271 | 9/2014 | |
| JP | 2015-105582 | 6/2015 | |
| JP | 2021-092202 | 6/2021 | |
| JP | 2021092202 A * | 6/2021 | |
| WO | WO 2011/132569 | 10/2011 | |
| WO | WO-2011132569 A1 * | 10/2011 | ......... F02D 19/0615 |

* cited by examiner

*Primary Examiner* — Kevin A Lathers

(57) ABSTRACT

Provided are; a fuel supply control device capable of preventing damage on components caused by LNG fuel in a liquid state; and a vehicle. The fuel supply control device is for controlling selective supply, to an engine, of either LNG fuel or CNG fuel stored in separated tanks, and is provided with: a determination unit for determining whether warming up of the engine is completed after start of the engine; and a control unit that performs CNG fuel supply control for supplying CNG fuel to the engine when the warming up of the engine is not yet completed, and performs LNG fuel supply control for supplying vaporized LNG fuel to the engine when the warming up of the engine is completed.

5 Claims, 3 Drawing Sheets

FUEL SUPPLY CONTROL DEVICE AND VEHICLE

TECHNICAL FIELD

The present disclosure relates to a fuel supply control device and a vehicle.

BACKGROUND ART

It is known, for example, to use liquefied natural gas (hereinafter referred to as LNG fuel) as engine fuel in vehicles and the like (see, for example, PTL 1). Liquid LNG fuel stored in a tank is vaporized by a vaporizer, and then supplied to the engine.

CITATION LIST

Patent Literature

PTL 1
   Japanese Patent Application Laid-Open No. 2021-92202

SUMMARY OF INVENTION

Technical Problem

LNG fuel contains a plurality of components (such as methane, ethane, propane and butane) with different boiling points. As such, at the engine start, the LNG fuel in liquid state may possibly be supplied to the engine due to a component with a high boiling point (such as butane) that has not vaporized. In that case, the supply path of the LNG fuel and/or components provided in the engine may be damaged, and defects such as gas leakage may occur.

An object of an aspect of the present disclosure is to provide a fuel supply control device and a vehicle that can prevent damage to components due to LNG fuel in liquid state.

Solution to Problem

A fuel supply control device according to an aspect of the present disclosure is configured to perform a control of selectively supplying to an engine one of LNG fuel and CNG fuel stored in respective different tanks, the fuel supply control device including: a determination part configured to determine whether the engine has been warmed up after the engine is started; and a control part configured to perform a CNG fuel supply control of supplying the CNG fuel to the engine when the engine has not been warmed up, and perform an LNG fuel supply control of supplying the LNG fuel that is vaporized to the engine when the engine has been warmed up.

A vehicle according to an aspect of the present disclosure includes the above-described fuel supply control device according to the aspect of the present disclosure.

Advantageous Effects of Invention

According to the present disclosure, damage to components due to LNG fuel in liquid state can be prevented.

DESCRIPTION OF EMBODIMENTS

An embodiment of the present disclosure is described below with reference to the drawings.

Figure 1:
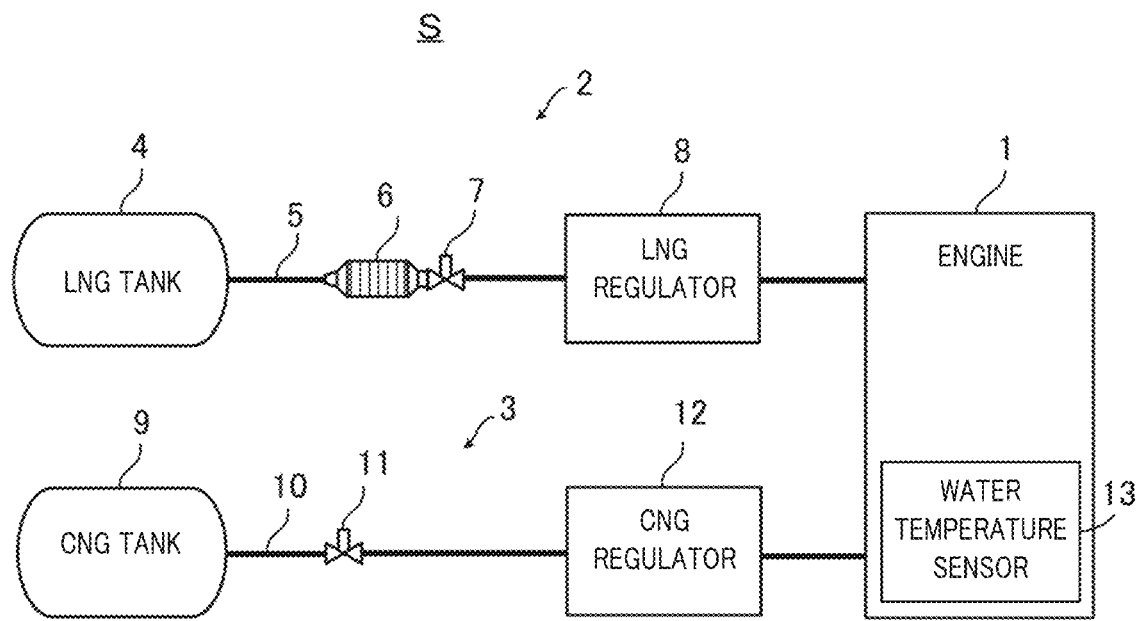
FIG. 1 is a diagram schematically illustrating an example of a fuel supply system and an engine according to an embodiment of the present disclosure.

First, with reference to FIG. 1, engine 1 and fuel supply system S according to the present embodiment are described. FIG. 1 is a diagram schematically illustrating an example of engine 1 and fuel supply system S.

Engine 1 and fuel supply system S illustrated in FIG. 1 are mounted in a vehicle (for example, a heavy-duty vehicle) not illustrated in the drawing, for example.

As illustrated in FIG. 1, fuel supply system S includes LNG fuel supply system 2 for supplying LNG fuel to engine 1, and fuel supply system 3 for supplying compressed natural gas (hereinafter referred to as CNG fuel) to engine 1.

Engine 1 is a driving source of a vehicle, and is a spark-ignition combustion engine that burns vaporized LNG fuel or CNG fuel by ignition. Note that although not illustrated in the drawings, engine 1 includes a plurality of cylinders, an injector that jets fuel to them and the like.

In addition, engine 1 is provided with water temperature sensor 13 that detects the temperature of a coolant for cooling engine 1. Water temperature sensor 13 is electrically connected to fuel supply control device 100 (see FIG. 2) described later. Water temperature sensor 13 detects the temperature of the coolant as necessary, and outputs information representing the temperature (hereinafter referred to as water temperature information) to fuel supply control device 100.

As illustrated in FIG. 1, LNG fuel supply system 2 includes LNG tank 4 that stores LNG fuel in liquid state, LNG fuel supply path 5, vaporizer 6 that vaporizes the LNG fuel, shut-off valve 7 that opens and closes LNG fuel supply path 5, and LNG regulator 8 that depressurizes the LNG fuel vaporized by vaporizer 6.

One end of LNG fuel supply path 5 is connected to LNG tank 4, and the other end of LNG fuel supply path 5 is connected to engine 1. In addition, LNG fuel supply path 5 is provided with vaporizer 6, shut-off valve 7, and LNG regulator 8 in this order from its upstream side.

Vaporizer 6 vaporizes the LNG fuel from LNG tank 4 with the above-described coolant. Although not illustrated in the drawings, a coolant channel (not illustrated in the drawing) extended from engine 1 is connected to vaporizer 6.

Shut-off valve 7 is electrically connected to fuel supply control device 100 (see FIG. 2) described later, and is controlled to an open state or closed state by fuel supply control device 100.

As illustrated in FIG. 1, CNG fuel supply system 3 includes CNG tank 9 that stores CNG fuel, CNG fuel supply path 10, shut-off valve 11 that opens and closes CNG fuel supply path 10, and CNG regulator 12 that depressurizes the CNG fuel.

One end of CNG fuel supply path 10 is connected to CNG tank 9, and the other end of CNG fuel supply path 10 is connected to engine 1. In addition, CNG fuel supply path 10 is provided with shut-off valve 11 and CNG regulator 12 in this order from its upstream side.

Shut-off valve 11 is electrically connected to fuel supply control device 100 (see FIG. 2) described later, and is controlled to an open state or closed state by fuel supply control device 100.

Figure 2:
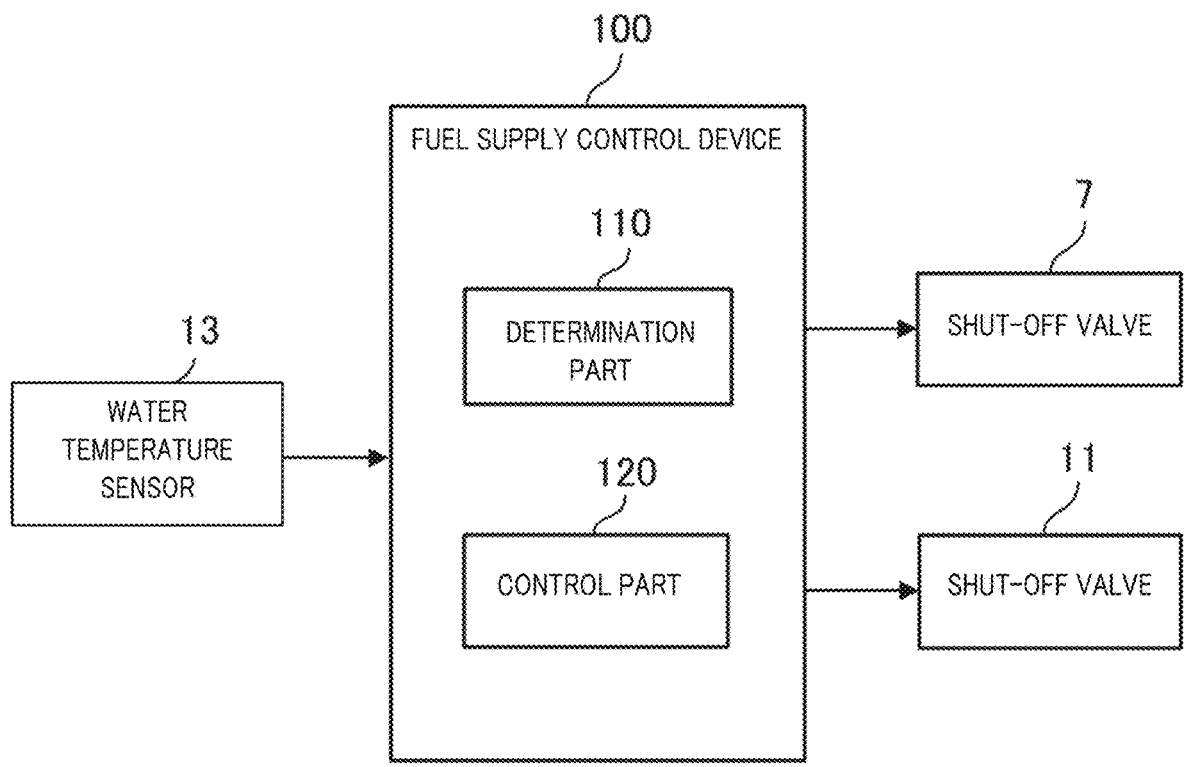
FIG. 2 is a block diagram illustrating an example of a configuration of a fuel supply control device according to the embodiment of the present disclosure.

Next, a configuration of fuel supply control device 100 of the present embodiment is described with reference to FIG. 2. FIG. 2 is a block diagram illustrating an example of a configuration of fuel supply control device 100.

Fuel supply control device 100 illustrated in FIG. 2 is mounted in a vehicle equipped with engine 1 and fuel supply system S.

Fuel supply control device 100 performs a control of selectively supplying one of the separately stored LNG fuel and CNG fuel to engine 1.

Although not illustrated in the drawings, fuel supply control device 100 includes, as hardware, a CPU (Central Processing Unit), a ROM (Read Only Memory) storing computer programs, a RAM (Random Access Memory) serving as a work memory, an input port, an output port and the like, for example. Each function of fuel supply control device 100 described below is implemented when a computer program read by the CPU from the ROM is executed in the RAM. Fuel supply control device 100 may be implemented by an ECU (Electronic Control Unit), for example.

As illustrated in FIG. 2, fuel supply control device 100 includes determination part 110 and control part 120.

When engine 1 is started, determination part 110 determines whether engine 1 has been warmed up.

For example, first, determination part 110 acquires water temperature information from water temperature sensor 13 after engine 1 is started.

Then, when the temperature of the coolant represented by the water temperature information is equal to or higher than a threshold value, determination part 110 determines that engine 1 has been warmed up.

On the other hand, when the temperature of the coolant represented by the water temperature information is not equal to or higher than the threshold value, determination part 110 determines that engine 1 has not been warmed up. In that case, determination part 110 acquires water temperature information anew, and determines whether engine 1 has been warmed up on the basis of the comparison between the temperature of the coolant represented by the water temperature information and the threshold value. This determination is repeated until the temperature of the coolant represented by the water temperature information becomes equal to or higher than the threshold value.

The above-mentioned threshold value (an example of the first threshold value) is a water temperature at which the LNG fuel can be regarded to be completely vaporized, for example. This first threshold value is set in advance on the basis of results of simulations or experiments.

When it is determined by determination part 110 that engine 1 has not been warmed up, control part 120 performs a control for supplying CNG fuel to engine 1 (hereinafter referred to as CNG fuel supply control).

More specifically, control part 120 controls shut-off valve 7 illustrated in FIG. 1 to the closed state, and controls shut-off valve 11 illustrated in FIG. 1 to the open state. In this manner, the CNG fuel stored in CNG tank 9 flows through CNG fuel supply path 10, and depressurized by CNG regulator 12 so as to be supplied to engine 1.

The above-described CNG fuel supply control is executed until engine 1 is completely warmed up (until the temperature of the coolant becomes equal to or higher than the threshold value).

On the other hand, when it is determined by determination part 110 that engine 1 has been warmed up, control part 120 performs a control for supplying LNG fuel to engine 1 (hereinafter referred to as LNG fuel supply control).

More specifically, control part 120 controls shut-off valve 7 illustrated in FIG. 1 to the open state, and controls shut-off valve 11 illustrated in FIG. 1 to the closed state. In this manner, the LNG fuel stored in LNG tank 4 flows through LNG fuel supply path 5, so as to be vaporized by vaporizer 6, then depressurized by LNG regulator 8, and then, supplied to engine 1.

Figure 3:
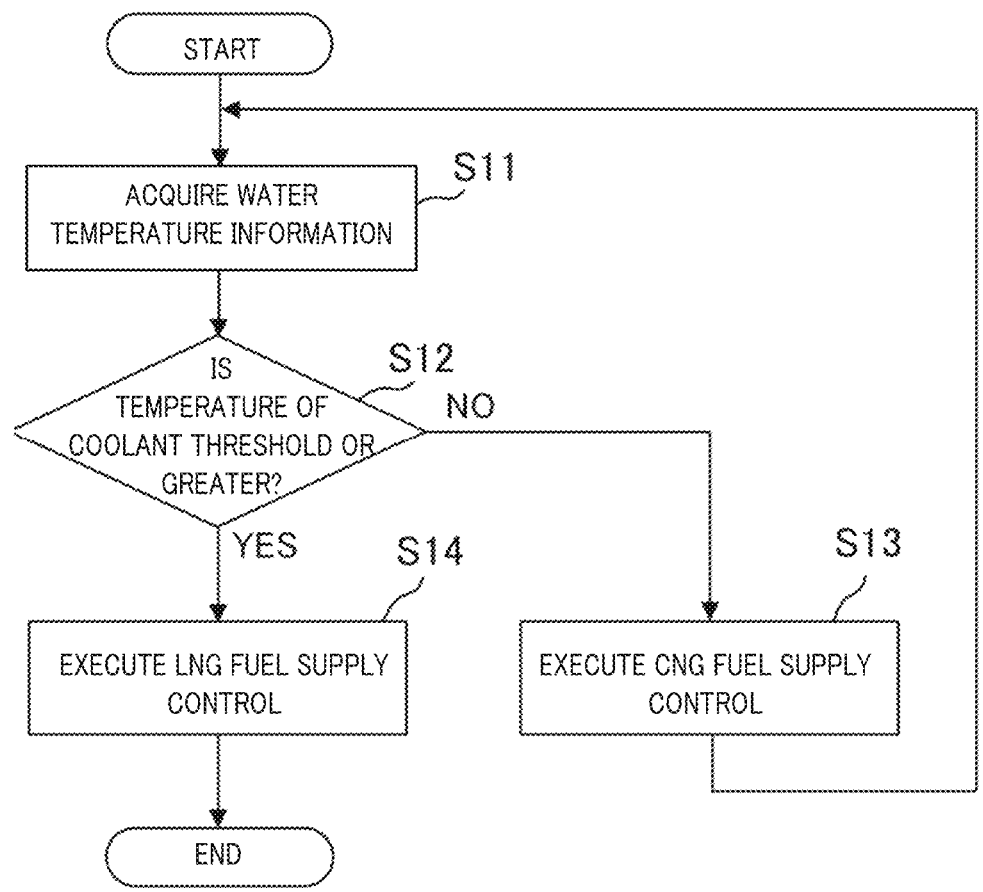
FIG. 3 is a flowchart illustrating an example of an operation of a fuel supply control device according to the embodiment of the present disclosure.

Next, an operation of fuel supply control device 100 is described with reference to FIG. 3. FIG. 3 is a flowchart illustrating an example of an operation of fuel supply control device 100.

The procedure of FIG. 3 is started at the start of the engine. Note that it is assumed that the residual quantity of the LNG fuel in LNG tank 4 and the residual quantity of the CNG fuel in CNG tank 9 are both enough to drive engine 1.

First, determination part 110 acquires water temperature information from water temperature sensor 13 (step S11).

Next, determination part 110 determines whether the temperature of the coolant represented by the water temperature information is equal to or higher than the threshold value (step S12).

When the temperature of the coolant is not equal to or higher than the threshold value (step S12: NO), determination part 110 determines that engine 1 has not been warmed up.

In that case, control part 120 executes the above-described CNG fuel supply control (step S13). Thereafter, the process is returned to step S11.

On the other hand, when the temperature of the coolant is equal to or higher than the threshold value (step S12: YES), determination part 110 determines that engine 1 has been warmed up.

In that case, control part 120 executes the above-described LNG fuel supply control (step S14). In this manner, the procedure is completed.

As described above, fuel supply control device 100 of the present embodiment is a device that performs a control of selectively supplying one of LNG fuel and CNG fuel stored in respective different tanks to engine 1. Fuel supply control device 100 includes determination part 110 that determines whether engine 1 has been warmed up after engine 1 is started, and control part 120 that performs the CNG fuel supply control of supplying the CNG fuel to engine 1 when engine 1 has not been warmed up, and performs the LNG fuel supply control of supplying vaporized LNG fuel to engine 1 when engine 1 has been warmed up.

With this feature, engine 1 can be driven with the CNG fuel when starting engine 1 such that the LNG fuel is not supplied to engine 1 until engine 1 is completely warmed up.

Thus, it is possible to prevent damages to the components provided in engine 1 and/or LNG fuel supply path 5 (more specifically, parts made of rubber used in components) with the LNG fuel in liquid state. As a result, problems such as gas leakage can be prevented, and the safety can be improved.

In addition, since the start of the engine using the LNG fuel in liquid state is not performed, starting problems (such as delayed starting time and rough idling) can be prevented.

In addition, since existing water temperature sensor 13 and opening/closing control of shut-off valves 7 and 11 are used, no costs are incurred.

The present disclosure is not limited to the description of the above embodiments, and various variations are possible to the extent that the intent is not departed from. The variations are described below.

Modification 1

Determination part 110 determines whether engine 1 has been warmed up on the basis of the temperature of the coolant in the example of the above-described embodiment, but this is not limitative. For example, determination part 110 may determine whether engine 1 has been warmed up on the basis of a detection result of a gas temperature sensor not illustrated in the drawing.

The gas temperature sensor is a sensor that is provided downstream of vaporizer 6, and detects the temperature of vaporized LNG fuel. The gas temperature sensor, which is electrically connected to fuel supply control device 100, detects the temperature of vaporized LNG fuel as necessary, and outputs information representing the temperature (hereinafter referred to as gas temperature information) to fuel supply control device 100.

Determination part 110 acquires gas temperature information from the gas temperature sensor after engine 1 is started. Then, determination part 110 determines whether engine 1 has been warmed up by comparing the temperature represented by gas temperature information and a threshold value.

The above-mentioned threshold value (an example of the second threshold value) is a temperature of gas at which the LNG fuel can be regarded to be completely vaporized, for example. This second threshold value is set in advance on the basis of results of simulations or experiments.

When the temperature represented by the gas temperature information is equal to or higher than the threshold value, determination part 110 determines that engine 1 has been warmed up. On the other hand, when the temperature represented by the gas temperature information is not equal to or higher than the threshold value, determination part 110 determines that engine 1 has not been warmed up.

Modification 2

In the above-mentioned embodiment, when the control is switched from the CNG fuel supply control to the LNG fuel supply control, control part 120 may control a notification device not illustrated in the drawing to provide a notification.

Examples of the notification device include lamp indicators, displays, and speakers provided inside the vehicle, for example.

For example, in the case where the notification device is a lamp indicator, control part 120 may turn off a lamp indicating that CNG fuel is being supplied, and turn on a lamp indicating that LNG fuel is being supplied.

In addition, for example, in the case where the notification device is a display, control part 120 may display an image indicating that the fuel is switched from the CNG fuel to the LNG fuel.

In addition, for example, in the case where the notification device is a speaker, control part 120 may output a sound indicating that the fuel is switched from the CNG fuel to the LNG fuel.

With the above-described notification, the user (such as a passenger of the vehicle) can easily recognize the switch from the CNG fuel to the LNG fuel.

In addition, control part 120 may control the notification device to provide a notification that engine 1 has not been warmed up until engine 1 has been warmed up. In this manner, the user can easily recognize that engine 1 has not been warmed up.

Modification 3

Fuel supply control device 100 is mounted in a vehicle in the above-described embodiment, but this is not limitative. Fuel supply control device 100 may be mounted in moving bodies other than vehicles (such as ships) or machines provided with stationary engines.

This application is entitled to and claims the benefit of Japanese Patent Application No. 2021-183342 filed on Nov. 10, 2021, the disclosure each of which including the specification, drawings and abstract is incorporated herein by reference in its entirety.

INDUSTRIAL APPLICABILITY

The fuel supply control device and the vehicle of the present disclosure are suitable for a case using liquefied natural gas containing a plurality of components with different boiling points as the fuel of the engine.

REFERENCE SIGNS LIST

S Fuel supply system
1 Engine
2 LNG fuel supply system
3 CNG fuel supply system
4 LNG tank
5 LNG fuel supply path
6 Vaporizer
7 Shut-off valve
8 LNG regulator
9 CNG tank
10 CNG fuel supply path
11 Shut-off valve
12 CNG regulator
13 Water temperature sensor
100 Fuel supply control device
110 Determination part
120 Control part

The invention claimed is:

1. A fuel supply control device configured to perform a control of selectively supplying to an engine one of LNG fuel and CNG fuel stored in respective different tanks, the fuel supply control device comprising:
   a determination part configured to determine whether a temperature of the LNG is higher than a threshold based on information from a sensor that measures the temperature of the LNG and
   a control part configured to perform a CNG fuel supply control of supplying the CNG fuel to the engine when the temperature of the LNG is not determined to be higher than the threshold, and perform an LNG fuel supply control of supplying the LNG fuel that is vaporized to the engine when the temperature of the LNG is determined to be higher than the threshold.

2. The fuel supply control device according to claim 1, wherein when a temperature of a coolant of the engine used for vaporization of the LNG fuel is equal to or higher than a first threshold value, the determination part determines that the engine has been warmed up; and wherein when the temperature of the coolant is not equal to or higher than the first threshold value, the determination part determines that the engine has not been warmed up.

3. The fuel supply control device according to claim 1, wherein when a temperature of the LNG fuel that is vaporized is equal to or higher than a second threshold value, the determination part determines that the engine has been warmed up; and wherein when the temperature of the LNG fuel that is vaporized is not equal to or higher than the second threshold value, the determination part determines that the engine has not been warmed up.

4. The fuel supply control device according to claim 1, wherein when a switch from the CNG fuel supply control to the LNG fuel supply control is performed, the control part controls a notification device to provide a notification of a fact that the switch from the CNG fuel supply control to the LNG fuel supply control is performed.

5. A vehicle comprising the fuel supply control device according to claim 1.

* * * * *